April 17, 1928.  1,666,863

J. ZICA

DIGGING, LIFTING, AND CONVEYING APPARATUS

Filed Jan. 15, 1925  5 Sheets-Sheet 1

John Zica, Inventor.

By Emil Neukark
Attorney

April 17, 1928. 1,666,869
J. ZICA
DIGGING, LIFTING, AND CONVEYING APPARATUS
Filed Jan. 15, 1925 5 Sheets-Sheet 2

John Zica, Inventor.
By Emil Hubert
Attorney.

April 17, 1928.
J. ZICA
1,666,869
DIGGING, LIFTING, AND CONVEYING APPARATUS
Filed Jan. 15, 1925
5 Sheets-Sheet 3
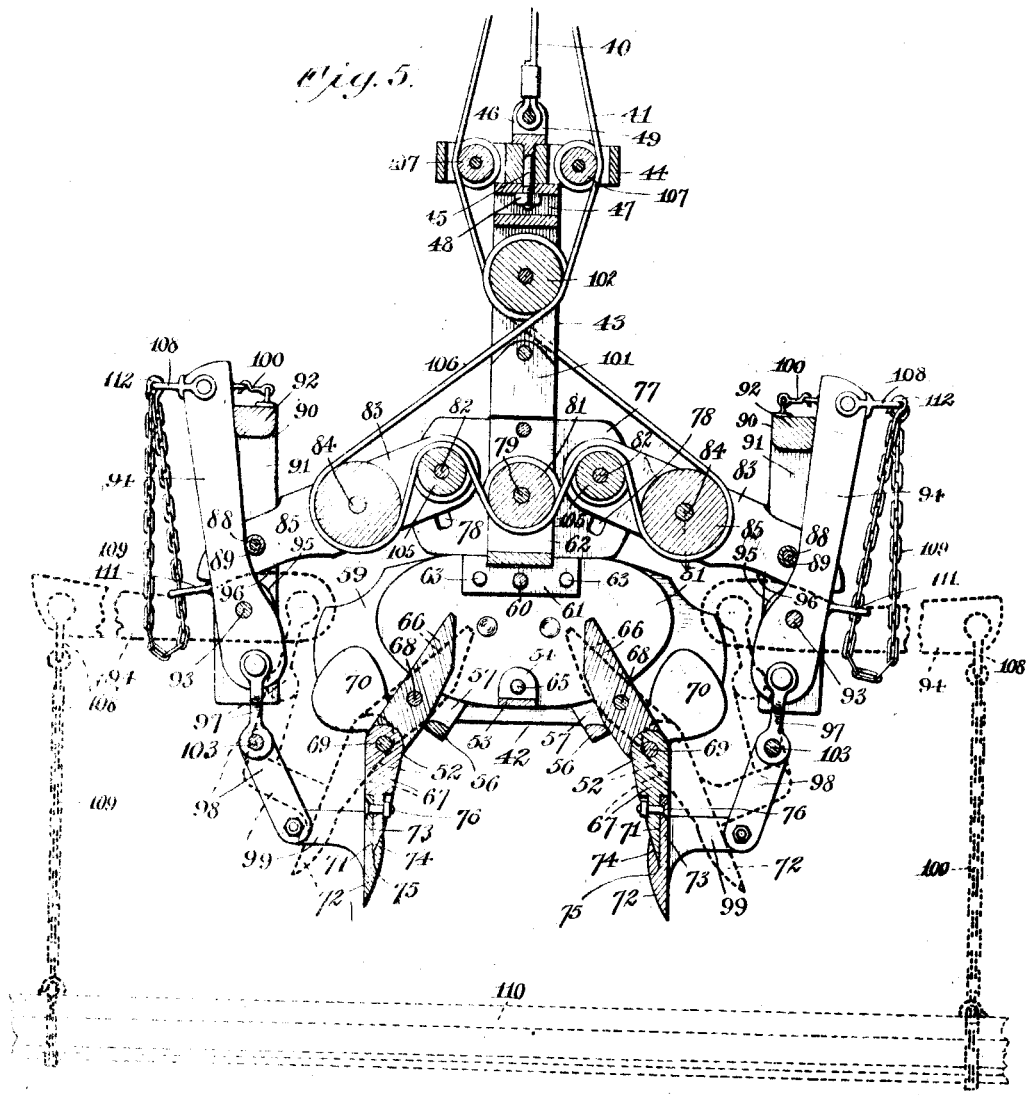

April 17, 1928.
J. ZICA
1,666,869
DIGGING, LIFTING, AND CONVEYING APPARATUS
Filed Jan. 15, 1925   5 Sheets-Sheet 4
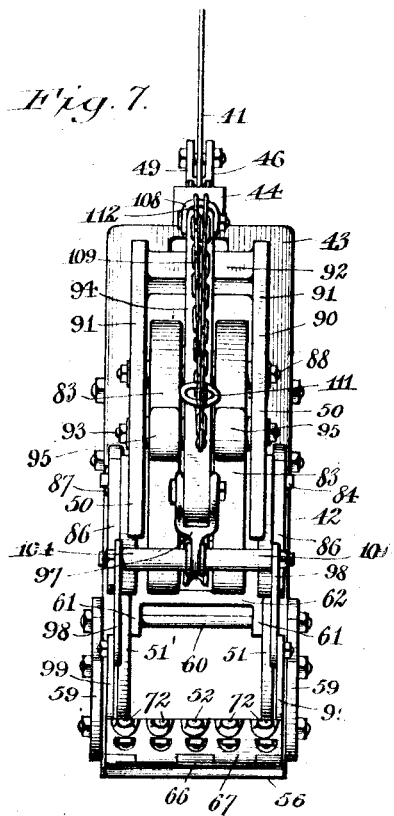
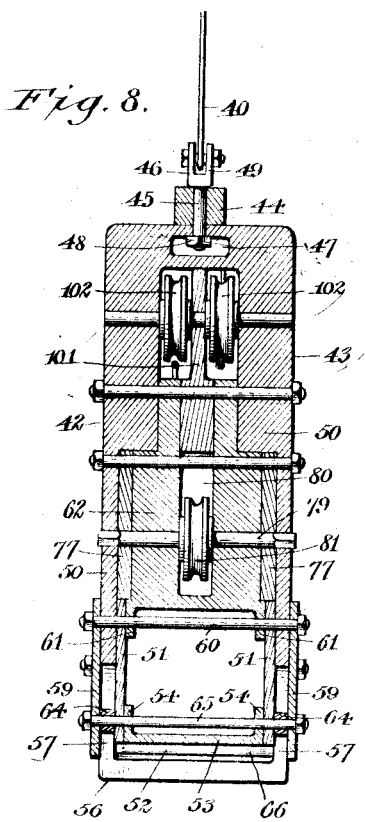
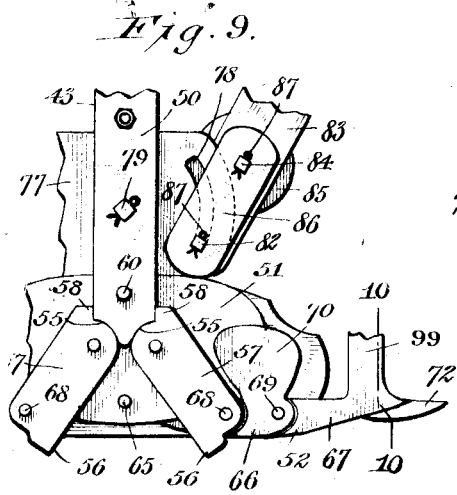
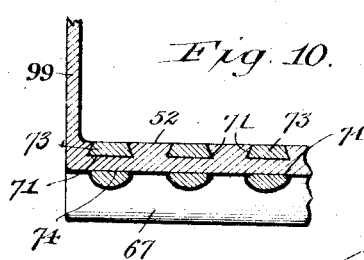
John Zica, Inventor.
By Emil Kenhart
Attorney.

April 17, 1928.
J. ZIĆA
1,666,869
DIGGING, LIFTING, AND CONVEYING APPARATUS
Filed Jan. 15, 1925 5 Sheets-Sheet 5
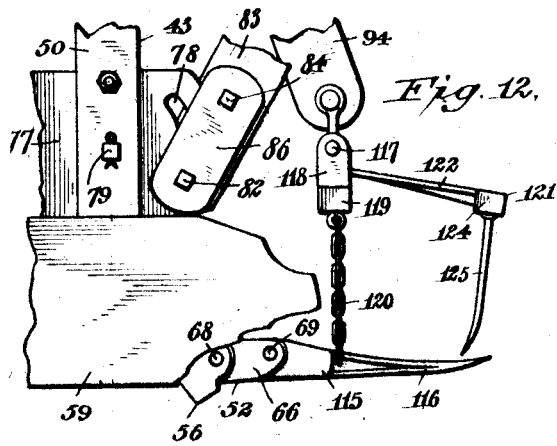
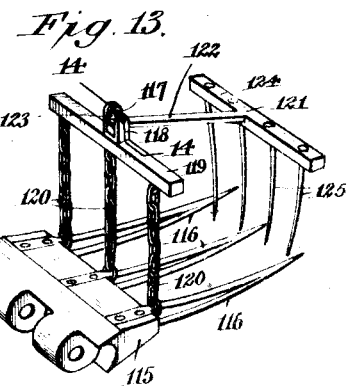
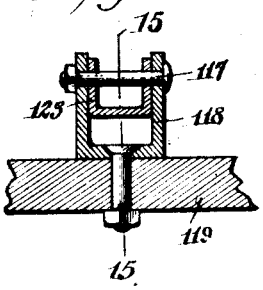
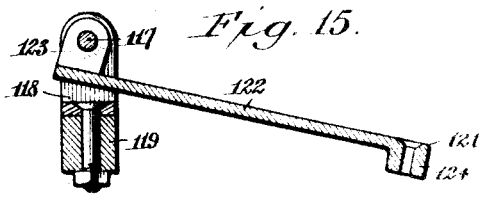
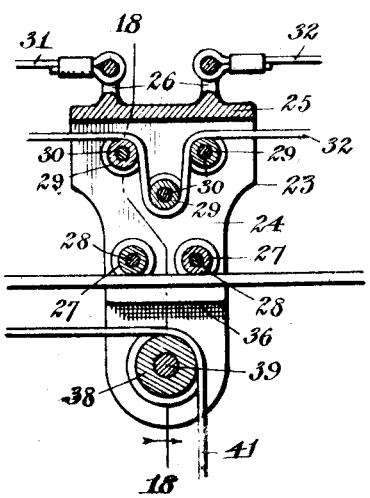
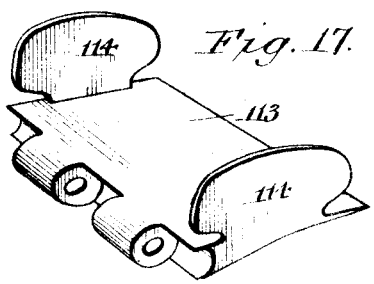
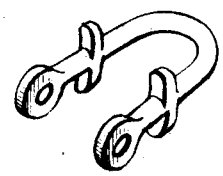
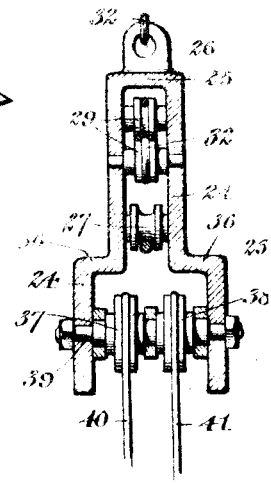
John Zica, Inventor.
By Emil Kulach
Attorney.

Patented Apr. 17, 1928.

1,666,869

UNITED STATES PATENT OFFICE.

JOHN ZICA, OF LACKAWANNA, NEW YORK, ASSIGNOR OF ONE-HALF TO JOSEPH PUDALOFF, OF NIAGARA FALLS, NEW YORK.

DIGGING, LIFTING, AND CONVEYING APPARATUS.

Application filed January 15, 1925. Serial No. 2,568.

My invention relates to improvements in digging, lifting and conveying apparatus and more particularly to that type used for digging cellars, trenches and other excavations and conveying the material dug to a distant point, also for lifting heavy objects.

My invention has for its object the provision of an apparatus in which a digging and lifting implement is supported from overhead in a novel manner, and which has digging elements movable from substantially horizontal to vertical position, which elements, during the action of digging, move from vertical position away from each other and assume a horizontal position, carrying with them dirt or other substances dug up, to be elevated and delivered to a distant point.

Another object of my invention is to provide a digging implement of considerable weight, and which is suspended from a point overhead so that when lowered it will dig into the ground and which also has means for causing the digging elements thereof to move outwardly and upwardly away from each other, and during such action take up the earth or other substances dug thereby and lift the same into the digging implement to be elevated and carried to a distant point.

A further object of my invention is to provide a digging implement having retainer sides and a table between said sides formed of digging elements adapted to be provided with digging prongs and be swung into vertical or substantially vertical position, and which digging implement has considerable weight so that when lowered, the digging prongs thereof will be driven into the earth; and to provide in conjunction therewith, operating mechanism comprising a cable or cables, cable sheaves, and elements carrying said sheaves and connected with said digging elements to elevate the same and carry upwardly with them a quantity of earth or other material, which material will be supported by said digging elements and be confined between said retainer sides to be delivered to a distant point.

A still further object of my invention is to provide a digging implement having digging elements adapted to engage the earth at spaced points, and to take up the earth by movement of said digging elements away from each other.

A still further object of my invention is to provide an implement of the kind described in which interchangeable digging elements may be used, or digging elements having interchangeable parts, certain forms of which are adapted for use in digging hard earth, clay, or the like, or for breaking and taking up concrete floors or masonry construction, other forms for digging sand or other loose material, and still others capable of being forced into hay and operating as a substitute for a hay fork.

A still further object is to provide a digging implement having means thereon for moving heavy objects, especially long objects, such as rails, lengths of water pipe, building material, and the like.

With the above and other objects in view, the invention consists in the novel features of construction and in the arrangement and combination of parts to be hereinafter described and more particularly pointed out in the subjoined claims.

In the drawings:—

Fig. 5 is a longitudinal section through the digging implement, showing the digging elements lowered to assume the position in which they are driven into the ground under weight of the apparatus.

Fig. 6 is a horizontal section taken on line 6—6, Fig. 2.

Fig. 7 is an end view of the digging implement.

Fig. 8 is a vertical section taken on line 8—8, Fig. 2.

Fig. 9 is a side view of a portion of the implement showing the outer plate or wall of the retainer side removed.

Fig. 10 is an enlarged vertical section taken on line 10—10, Fig. 9.

Fig. 11 is a detached perspective view of one of the digging prongs.

Fig. 12 is a side elevation of a portion of the implement showing a portion of the outer side wall of the digging element broken away and a hay fork and hay retainer device substituted therefor.

Fig. 13 is a detached perspective view of the hay fork and hay retainer device shown in Fig. 12.

Fig. 14 is an enlarged transverse section taken on line 14—14, Fig. 13.

Fig. 15 is a longitudinal section taken on line 15—15, Fig. 14, showing the hay retaining prongs omitted.

Fig. 16 is a vertical section through the pulley block by means of which the digging implement is supported and moved from one point to another.

Fig. 17 is a detached perspective view showing a further modification of the outer portion of one of the digging elements.

Fig. 18 is a vertical section taken on line 18—18, Fig. 16, looking in the direction of the arrow crossing said line.

Fig. 19 is a detached perspective view of one of the clevises used on the connector levers of the digging implement.

Figure 1:
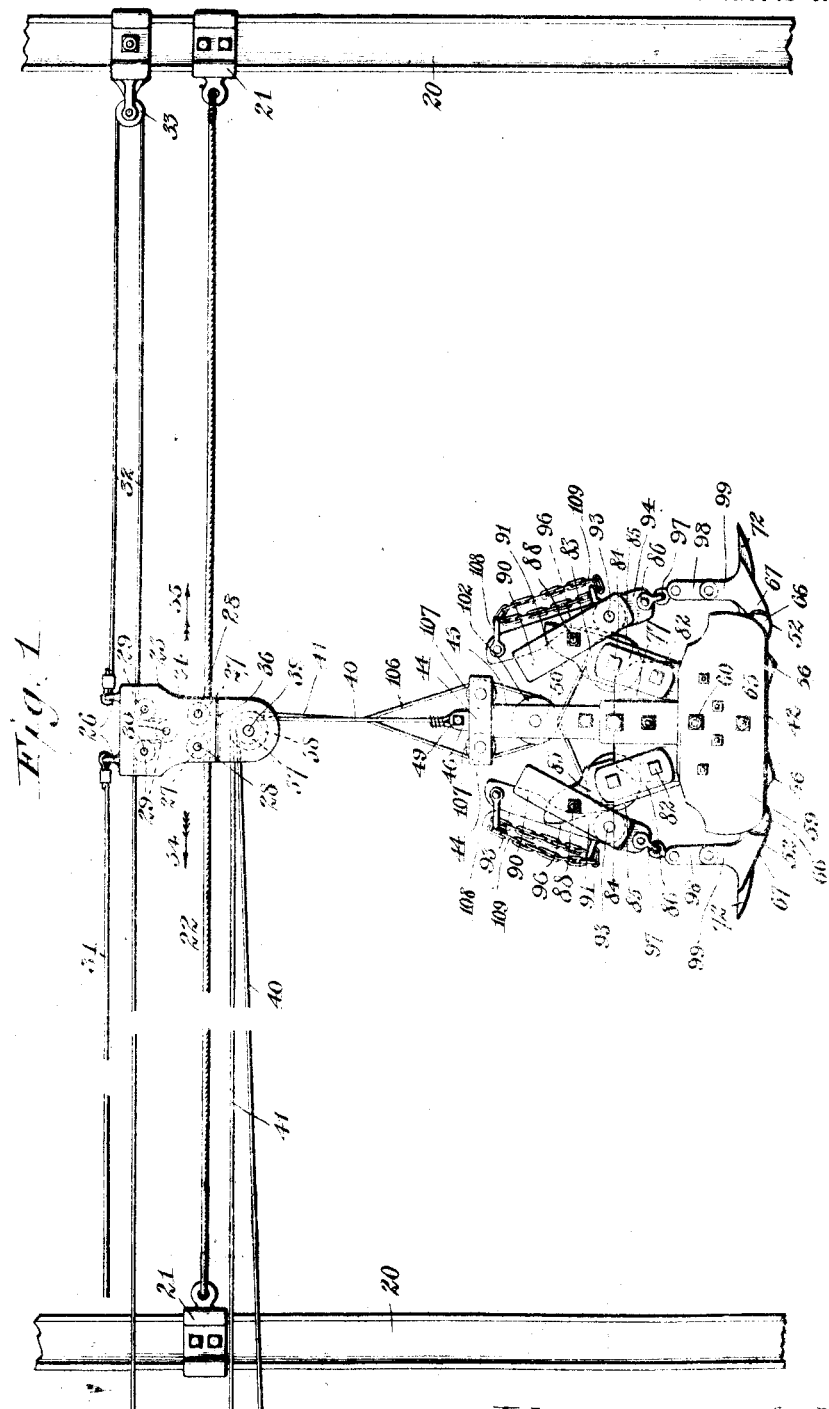
Fig. 1 is a side elevation of my improved digging implement and my novel means for use in connection therewith for raising and lowering said implement and for moving the same from one point to another.

In the embodiment of my invention illustrated, I have shown the digging implement suspended from an overhead support comprising two uprights 20 spaced any suitable distance apart and having clamps 21 secured thereto to which opposite ends of a supporting cable 22 are secured, said cable being stretched in any suitable manner between the clamps on the supports so as to form a track for a pulley block 23. This pulley block comprises a housing having two spaced side members 24 connected at the top by a horizontal wall 25 on the upper side of which eyes 26 are formed.

Arranged between the side members of the pulley block are two spaced guide pulleys 27 which are rotatable on pins 28 fastened in opposite side members, and above said guide pulleys is a set of three cable sheaves or pulleys 29, two of which are pivoted in the same horizontal plane and the third in a lower plane, the three being spaced apart and rotatable on pins 30, also fastened in opposite side members of the pulley block.

Fastened to one of the eyes 26 is a "pullback" cable 31 which extends in one direction, and fastened to the other eye 26 is a draw cable 32 which extends in an opposite direction, the draw cable being passed around a sheave or pulley 33 fastened to one of the uprights 20 and thence directed back into the pulley block 23 where it passes over the two of the three cable sheaves or pulleys 29 arranged in the same plane and underneath the third cable sheave or pulley 29. The pull-back and draw cables may be wound around a power-operated drum for operating the same, or these cables may be operated in any other suitable manner, and when pulling upon the cable 31 the pulley block will be moved in the direction of the arrow 34, Fig. 1, while, when pulling upon the cable 32, the pulley block will be moved in the direction of the arrow 35, Fig. 1.

The housing of the pulley block is widened at its lower end by offsetting the lower portions of the side members thereof, as shown at 36, Fig. 18, thus the lower portions of the side walls are spaced apart a greater distance than the upper portions thereof, and between the lower portions two cable pulleys 37, 38, are rotatably mounted on a pin 39 fastened to the opposite side walls. These cable pulleys 37, 38 may be of different diameters, as shown by dotted lines in Fig. 1, or they may be of like diameter, as shown in Fig. 18. Passing over one of said cable pulleys 37 or 38 is a hoisting and lowering cable 40, and passing over the other of said cable pulleys is an operating cable 41.

To the lower end of the raising and lowering cable 40 is fastened the digging implement designated by the numeral 42. This digging implement has an inverted U-shaped frame 43 from which the remaining portions of the implement receive support, directly or indirectly, and extending across the top of said frame is a pulley housing 44 which is held to said U-shaped frame by the pin 45 of a swivel 46, said pin extending through the pulley housing from the top and through a portion of the U-shaped frame, which is provided with an opening 47 in which the lower end of said pin terminates, a nut 48 being threaded onto said pin within said opening, as clearly shown in Figs. 2, 5, and 8, the nut being sufficiently loose to permit the pin to rotate. The forked upper end 49 of the swivel has the lower end of the raising and lowering cable 40 secured thereto.

Fastened to the lower ends of the two depending arms 50 of said inverted U-shaped frame 43 is the bucket of the apparatus, which comprises side walls 51 and a bottom formed of movable digging elements 52. The upper portions of these side walls lie inside of the depending arms 50 of the inverted U-shaped frame and the digging elements 52 are movable between the lower portions of said side walls.

53 designates a spacing member, which connects the lower portions of said side walls and is positioned between the inner ends of said digging elements, said spacing member being in the form of a flat bar having upwardly-directed lugs 54 at opposite ends which lie in contact with the inner surfaces of said side walls. The lower ends of the depending arms 50 of said inverted U-shaped frame are concaved at opposite edges, as at 55, to form pointed or substantially V-shaped terminals, with which cooperate two oppositely-inclined substantially U-shaped members 56, the side arms 57 of which lie against the outer sides of the side walls 51 and the cross members of which extend underneath the digging elements 52 near their inner ends and support the same when in horizontal position. The arms 57 are rounded at their upper ends to conform to and fit into the concaved portions 55 at the lower extremities of the inverted U-shaped frame. Each of said side arms 57 has an upstanding lug 58, the lugs of the side arms at the same side of the bucket bearing against opposite edges of the interposed depending arm of said inverted U-shaped frame, as clearly shown in Fig. 9.

Applied to the outer surfaces of the lower portions of the depending arms 50 of said inverted U-shaped frame and to the outer surfaces of the side arms 57 of the substantially U-shaped members 56, are supplemental side walls 59 which are held spaced from the side walls 51 by said depending arms 50 and said side arms 57. The side walls 51 and 59 are fastened to the lower extremities of said depending arms 50 by a tie bolt 60, which also passes through depending lugs 61 formed on a combined spacing and pulley block 62 positioned between the depending arms 50 of said inverted U-shaped frame and having said depending lugs 61 fastened against the inner sides of the side walls 51 at their upper ends by rivets 63 arranged at opposite sides of the tie bolt 60.

Between the side walls 51 and the supplemental side walls 59 near their lower ends, are spacing sleeves 64, and a tie bolt 65 is passed through said side walls 51, the supplemental side walls 59, the spacing sleeves 64 and the upwardly-directed lugs 54 of the spacing member 52. The combined spacing and pulley block 62 has its depending lugs 61 engaging the inner sides of the side walls 51 at their upper ends and the spacing member 5 engages the inner sides of said side walls, at their lower ends, both serving to hold said side walls in proper spaced relation while the tie bolts 60 and 65 tie the sides of the bucket together. The side walls 51 and the supplemental side walls 59 may be said to serve as the opposite sides of the bucket, and these sides are further tied together by the cross members of the substantially U-shaped members 56, which U-shaped members may be said to properly truss the parts and prevent buckling under the severe strain to which the bucket is subjected.

Each of the digging elements 52 comprises two sections 66, 67 which, when in one position are alined and slightly spaced apart at their inner ends. These digging elements provide a bottom and are adapted to carry dirt or other material dug during excavating. The slight space between the inner ends of said digging elements is occupied by the tie bolt 65, which may also be said to serve as a part of the bottom, since it fills the space between said digging elements and prevents dirt or other material carried thereby from dropping through said space.

The sections 66 at the inner ends of said digging elements may be referred to as permanent sections, while the remaining sections 67 may be considered replaceable sections. The inner or permanent sections 66 are pivotally mounted in the lower ends of the side arms 57 of the substantially U-shaped members 56, as at 68, which side members may also be referred to as struts, and the outer or replaceable sections 67 are pivotally secured to the outer ends of said inner or permanent sections, as at 69. The purpose of so mounting and connecting the sections is to allow each outer or replaceable section to swing with the inner or permanent section of each digging element, and also allow the outer section independent swinging movement, as will be described hereinafter.

It is to be noted that the inner sections of the digging elements, in addition to receiving support from the pivots by means of which they are mounted, also rest upon the cross members of the substantially U-shaped members 56, and the connection of the outer sections of the digging elements to the inner sections thereof is what may be termed an interlocking pivoted connection similar to a hinge, each section having spaced depressions and projections, the projections of one being adapted to enter the depressions of the other and the pivot 69 connecting the sections of each member being passed through the projections thereof.

Figure 2:
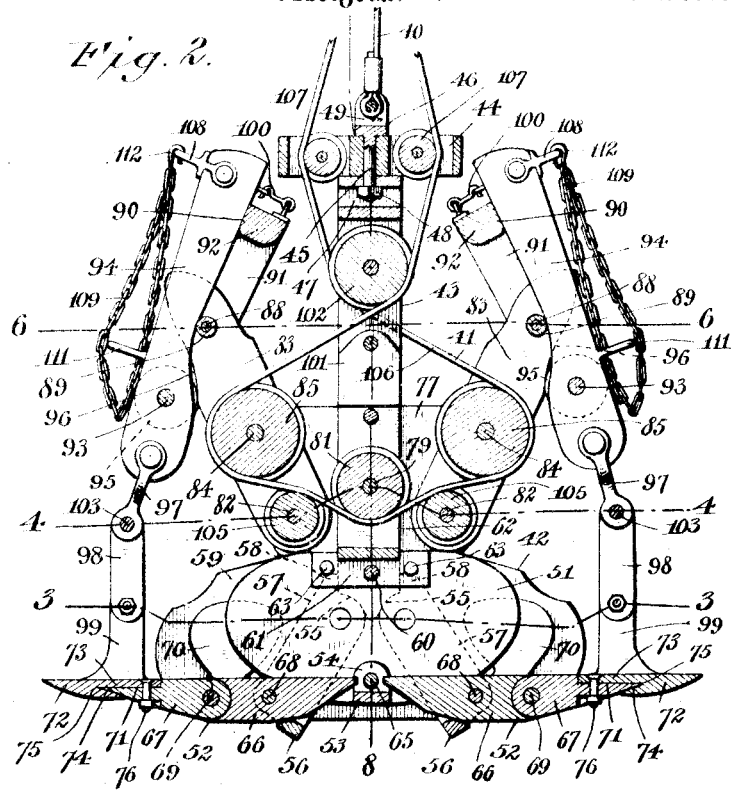
Fig. 2 is an enlarged longitudinal section through the digging implement.
Figure 3:
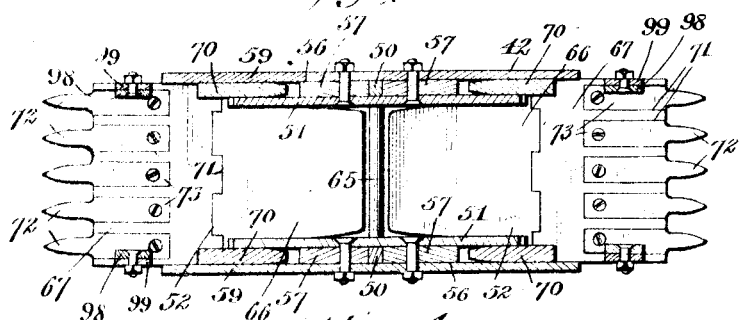
Fig. 3 is a horizontal section taken on line 3—3, Fig. 2.

Each of the inner sections has at opposite edges upstanding wings 70, which are adapted to enter the spaces between the side walls 51 and 59, as clearly shown in Fig. 3, and these wings may be said to form part of the sides of the bucket. The outer sections of the digging elements vary according to the material which they are intended to dig into. For hard pan, rocky material, cement surfaces or the like, I preferably employ the construction shown in Figs. 1 to 3 and 9 to 11, and in this construction each of the outer sections is provided with a transverse series of parallel dovetailed grooves 71 on its upper sides in which digging prongs 72 are secured, said prongs having inwardly dovetailed extensions 73 fitting into said dovetailed grooves, and inwardly-opening slots 74 into which the outer end portion of the outer section fits, the bights 75 of the slots of said prongs assisting in receiving the thrust during operation of the apparatus. The prongs are held in the dovetailed grooves 71 by means of screw bolts 76, each prong having a screw hole formed therein and the body portion of the outer section having a screw hole near the inner end of each dovetailed groove formed therein, the screw bolts 76 being passed through said holes and having nuts applied thereto, as best shown in Fig. 2. Screw bolts are preferably employed, since they permit the ready removal of the prongs when worn or when desired to replace them with another type of prongs.

Above the side walls 51 of the bucket and between the depending arms 50 of the inverted U-shaped frame and the combined spacing and pulley block 62, supporting plates 77 are arranged. These supporting plates extend outwardly beyond opposite edges of said depending arms and near each end of each plate is a segmental slot 78. These slots have their centers co-axial with a shaft 79 extending through the depending arms 50 of the inverted U-shaped frame, the supporting plates 77 and the combined spacing and pulley block 62, and on this shaft, within the opening 80 in said combined spacing and pulley block, is a cable sheave 81 which has its axis in a plane taken transversely through the center of the apparatus.

The segmental slots 78 are arranged in pairs at opposite sides of a plane extending transversely through the center of the bucket and the inverted U-shaped frame supporting the same. Spanning the space between the supporting plates 77 and extending through the segmental slots thereof, are pivot pins 82, which have secured thereto in any suitable manner, operating levers 83, the pivot pins 80 being passed through the inner ends of said levers. Said operating levers normally extend upwardly and outwardly in opposite directions. These operating levers are also arranged in pairs, as clearly shown in Fig. 7, and on the pivot pins 82, cable sheaves are rotatably mounted. Passing through each pair of said operating levers a distance outwardly from the pivot pin 82 at the inner ends thereof, is a pin 84 on which a cable sheave 85 is arranged, said pins 84 and the pivot pins 82 having square ends which prevent rotation of said pins. The square ends of the pivot pins extend outwardly through the segmental slots 78, and the square ends of the pins 84 also extend outwardly from opposite sides of the operating levers a similar distance.

Connector bars 86 which have square openings therein fit onto the square ends of said pins 82 and 84, and cotter pins 87 are passed through said square ends to hold said connector bars in place. In this manner the pivot pins 82 and the pins 84 are permanently retained and a fixed connection provided between said pins. Passed through each pair of said operating levers near their outer ends are supporting pins 88, each pin having a roller 89 mounted thereon between each pair of levers, the supporting pins 88 extending outwardly beyond the outer faces of said levers and each pin supports an inverted U-shaped carrier 90.

Each carrier comprises two side members 91 and a cross member 92 connecting the upper or outer ends of said side members. Near the inner or lower ends of the side members of each carrier, a pivot pin 93 is arranged, the ends of said pins being fastened in said side members 91 and having a lifting and lowering lever 94 pivotally secured thereto. Each lifting and lowering lever is disposed midway between the side members of one of said carriers and between the side members of each carrier and the lifting and lowering lever secured thereto, are rollers 95, said rollers having said pivot pins as their centers. The outer edges of the operating levers 83 are cut or otherwise fashioned into cam formation, as at 96, and these cam shaped edges, as they may be termed, lie in contact with the rollers 95.

The pivot pins 93 pass through the lifting and lowering levers near their lower or inner ends, and each of said ends has connected thereto a clevis 97 fastened to a rod 103 having opposite ends secured to the upper ends of links 98 pivotally connected to arms 99 extending upwardly from each outer section of the digging elements 52, each of said rods having spacing sleeves 104 positioned thereon, the inner ends of which bear against opposite sides of one of the clevises 97 and the outer ends of which bear against the inner sides of said links 98. In this manner a flexible connection is provided between the outer sections of the digging elements and said lifting and lowering levers. These lifting and lowering levers extend upwardly and normally lie against the outer edges of the cross members 92 of the U-shaped carriers and are retained in such position by means of retainer hooks 100, or otherwise, this being the position of the levers 94 when using the apparatus as a digging implement.

The opening 80 in the combined spacing and pulley block extends from a point near the lower end thereof to the upper end thereof, and in the upper end of this opening a separator 101 is arranged. This separator divides the space between the depending arms of the inverted U-shaped frame 42, and between said separator and said depending arms cable sheaves 102 are located, said sheaves being rotatable on a pin extending through said inverted U-shaped frame and separator.

Figure 4:
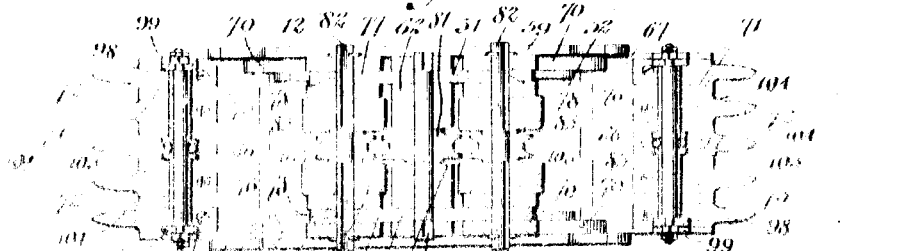
Fig. 4 is a horizontal section taken on line 4—4, Fig. 2.

On the pins 82 having their ends extending through the segmental slots 78 and between the operating levers 83, are cable sheaves 105, said sheaves being rotatable on said pins, due to the fact that said pins have opposite ends made square, as clearly shown in Fig. 4.

The operating cable 41 passes over the cable pulley 37 and is provided with a loop 106. This loop, at a central point, passes underneath the cable sheave 81, and from this point it may be said to extend in two stretches directed outwardly over the cable sheaves 105 thence around the cable sheaves 85, and thence inwardly, one strand passing around one of the cable sheaves 102 in the inverted U-shaped frame and the other around the other cable sheave 102 in said frame, thence upwardly in contact and around the sides of cable sheaves or pulleys 107 in the pulley housing 44 and finally upwardly and inwardly to a common point, from which point the operating cable continues in a single stretch to the point at which its operation is controlled.

When operating the apparatus, for digging hard material for example, the digging elements having prongs, such as 72, are used. After deciding the point at which digging is to take place, the pull back cable 31, or the draw cable 32, are operated with a view of moving the pulley block 23 along the supporting cable 22 to position the digging apparatus directly over the point at which digging is to take place. With the apparatus properly positioned, the operating cable 41 is paid out sufficiently to relieve the inward pull on the operating levers 83, and when strain on the operating cable is relieved, the weight of these levers with the cable sheaves 85 will cause said levers to move outwardly and downwardly, the cam edges 96 of said levers acting against the rollers 95 and causing the carriers 90, the lifting and lowering levers 94 mounted thereon and the connection between said levers and the digging elements to move downwardly. This causes the digging elements to move from the position shown in Fig. 2 to the position shown in full lines in Fig. 5. During this action the pivot pins 82 will have moved upwardly in the segmental slots 78, as shown in said last-mentioned figure. With the parts in this position, the prongs are directed downwardly in substantially vertical planes, this being the position of the outer sections of the digging elements from end to end thereof, while the inner sections assume almost vertical positions.

As the apparatus is quite heavy, the quick lowering of the same by paying out the raising and lowering cable 40 will cause the prongs to penetrate deeply into the material to be dug. In fact, depending on the nature of the material, or more definitely its hardness, the apparatus may be raised and lowered a number of times under quick movements so that assurance will be had of the hardest material being penetrated or entered to a sufficient extent to assure a quantity of material being dug up and lifted during the further operation of the apparatus. With the digging elements properly penetrated in the material to be dug, the operating cable 41 is drawn upon, and this causes the loop portion 106 of said cable to act on the cable sheaves 85 carried by the operating levers 83, causing said levers to swing upwardly and inwardly, which will necessarily, through the connection of said levers with the digging elements, cause said elements to move outwardly and upwardly, pulling into the soil or other material, and lifting a good portion thereof onto said digging elements so that during the movement of the parts from the position shown in Fig. 5 to those shown in Fig. 2, the soil will be forcibly moved outwardly in opposite directions and be lifted by the digging elements until a full load moves into the bucket where it is retained by said digging elements and the sides of the bucket, and during such movement, the wings 70, which serve as movable parts of the sides, assist in preventing considerable of the material being lost over the sides of the digging elements.

By having the operating cable 41 pass around the cable sheaves 85 carried by the operating levers 83, and by reason of said levers swinging on centers a distance from said cable sheaves, and particularly by reason of said operating levers extending outwardly a considerable distance for connection to parts attached to the digging elements, a powerful leverage is provided which will assure the tearing up of concrete floors, hard surfaces, masonry walls, and other well knitted or bonded structures. It is to be noted that in this apparatus the digging elements operate at spaced points, and that the action of said elements during the digging operation is away from each other or outwardly, in contradistinction to the usual method in which the digging elements move toward each other.

While I have shown a straight-lined track or guide for the apparatus, furnished by using the supporting cable 22, it will be apparent that the hoisting and lowering cable 40 and the operating cable 41 may be operated through the medium of a power machine having a boom, from which the digging implement may be suspended, raised and lowered, and swung to any desired point, or it may be supported by any other type of power machine.

The lifting and lowering levers 94 are also usable to convert the digging apparatus into a lifting apparatus so as to serve the purpose of a derrick, and when the apparatus is so used, the retainer hooks 100 are unhooked from said levers and said levers swung downwardly from the position shown in full lines in Fig. 5 to that shown in dotted lines. When so positioned the levers extend outwardly substantially in a horizontal plane, and for the purpose of utilizing them for lifting purposes, each has a clevis 108 secured to its outer end to which one end of a chain 109 is secured. These chains may be lowered, as shown in dotted lines in Fig. 5, and passed around rails, iron beams, lengths of water pipe, large boulders, or other heavy objects, as shown at 110, and when thus arranged, the digging elements and the parts connecting said elements with the inner ends of said lifting and lowering levers assume the positions shown in dotted lines in said figure. When the apparatus is used for digging, the lifting and lowering levers are elevated and retained in position by the retainer hooks 100. The chains may be passed through eyes 111 formed on the outer edges of said levers, the free ends of said chains being provided with hooks 112, which are hooked into the clevises 106. The apparatus may therefore be used for the purposes of lifting heavy objects, as readily as for the purpose of digging and lifting and conveying the material dug.

In lieu of the outer sections of the digging elements which are provided with the prongs 72 and which are intended for use in digging hard material or substances, an outer section, such as shown in Fig. 17, may be substituted therefor, and in such case the outer section comprises an outwardly-tapered plate 113 having its outer edge sharpened, similar to a shovel, and as these outer sections are intended for use in digging sand or other loose material, I provide at each side of each outer section an upstanding wing 114 adapted to prevent the material falling over the side edges of said section.

When substituting the outer section, such as shown in Fig. 17, for the outer section shown in Figs. 2 and 4 and other figures of the drawing, it is simply necessary to remove the pivots 69 and draw the toothed sections 67 outwardly, after which sections, such as shown in Fig. 17, may be substituted and the pivot pins 69 replaced.

In Figs. 12 to 15, I have shown an outer section 115 adapted for use as a hay fork, and in these figures the outer section is made comparatively short and has sharp elongated prongs 116 secured thereto. The clevis 97 at each end of the implement is secured to a pin 117 passed through a substantially U-shaped member 118 fastened to the upper side of a cross bar 119 having chains 120 secured to the under side thereof, said chains depending from said cross bar and being attached to the elongated prongs 116 of said outer section 115. A device thus applied to the opposite ends of the implement converts the implement from a digging implement into a hay fork or hay lifting apparatus capable of use for lifting loose hay and carrying the same from one place to another, but particularly adapted for use in transferring hay from wagons into hay lofts. In order to keep the hay on the prongs 116 of the outer section 115, a retaining device is used. This device consists of a swinging frame 121 comprising a bar 122 having a forked inner end 123 positioned within the U-shaped member 118 and having the pivot pin 117 passed therethrough. At the outer end of said bar 122, a cross bar 124 is provided, from which depend retainer prongs 125 adapted to enter a stack of hay held on the prongs 116.

Having thus described my invention, what I claim is:—

1. A suspended digging implement comprising a bucket provided with a bottom having spaced digging elements movable away from each other during digging operation, combined with means for so moving said digging elements.

2. A suspended digging implement comprising a bucket provided with a bottom having a pair of pivotally secured digging elements adapted to be moved into substantially vertical position preparatory to digging, said digging elements engaging the earth or material to be dug at spaced points, and means for moving said digging elements outwardly and upwardly away from each other.

3. In an apparatus of the kind described, a digging element having a bucket provided with sides and two digging elements normally horizontally-disposed and forming the bottom of said bucket, said digging elements being pivotally mounted between said sides and adapted to be swung into vertical position for digging into the earth or other material, and means for moving said digging elements outwardly away from each other during digging operation.

4. A digging apparatus, comprising a bucket having retainer sides, digging elements normally horizontally disposed between said sides, each digging element comprising an inner section and an outer section and having the inner ends of said inner sections in close relation, the outer sections being pivotally secured to said inner sections, means to allow the outer sections to assume a vertical position and engage the earth at spaced points, and means for swinging said outer sections outwardly and upwardly to dig up the earth.

5. In an apparatus of the kind described, a digging implement having a bucket provided with spaced digging elements movable from horizontal to vertical position, and reversely, said digging elements when in vertical position being adapted to engage spaced points of the material to be dug, and means for moving said digging elements outwardly from vertical position to horizontal position during digging operation.

6. In an apparatus of the kind described, a digging implement having a supporting frame, a bucket at the lower end of said frame having retainer sides secured to said frame and digging elements extending outwardly between opposite ends from said retainer sides, and means carried by said supporting frame connected to said digging elements for raising and lowering the same, said digging elements having digging prongs at their outer end and when raised being alined with the bottom of said bucket.

7. In a digging implement, a bucket having a bottom including a pair of horizontally-disposed separately pivoted digging elements adapted to have at least portions thereof swing into substantially vertical position to enter material to be dug at spaced points, and means for moving said digging elements outwardly away from each other and returning the same to horizontal position.

8. In a digging implement, a pair of digging elements forming the bottom of a bucket and pivotally mounted, each digging element comprising two sections, one section of each digging element being pivotally secured at a fixed point and the other being pivotally connected to said first-mentioned section, and means to cause one section of each digging element to swing with the other and to swing through an arc of a circle independent of the other for assuming a digging position, said means serving also to return said sections to normal position during digging operation.

9. A digging implement, comprising a bucket having retainer sides and digging elements disposed between said sides and arranged in horizontal position with the inner edges thereof in close relation, each digging element comprising an inner section pivotally mounted between said sides and receiving support therefrom and an outer section pivotally secured to the outer end of each inner section, and means for swinging said digging elements to cause the same to dig into material at spaced points and to move outwardly and upwardly therefrom so as to return to normal position with a load of material dug carried thereby.

10. A digging implement, comprising a bucket having sides and digging elements pivotally mounted between said sides and receiving support therefrom, said digging elements being disposed in horizontal position with their inner ends in close relation to form the bottom of said bucket, each digging element comprising an inner section and replaceable outer sections pivotally connected at their inner ends to the outer ends of said inner sections.

11. A digging implement comprising a bucket having spaced sides and a bottom between said sides formed of horizontally-disposed digging elements pivotally mounted and supported by said sides, said digging elements having their inner ends in close relation and being provided with removable digging prongs at their outer ends.

12. A digging implement having an inverted U-shaped supporting frame, a pair of U-shaped members having their side arms converging upwardly and engaging the lower ends of the depending arms of said inverted U-shaped frame, a bucket carried by said inverted U-shaped frame and having sides fastened thereto and to said U-shaped members, and a pair of digging elements in horizontal alinement having their inner ends in close relation and receiving support from the cross members of said U-shaped members, said digging elements being pivotally mounted between said sides, and means for actuating said digging elements from an elevated point.

13. In a digging implement, a bucket having sides and a bottom formed by two horizontally-disposed digging elements pivotally mounted between said sides and adapted to swing from horizontal to substantially vertical position, and reversely, said sides comprising two spaced side walls and said digging elements having upstanding wings adapted to enter the spaces between said side walls when said digging elements are in horizontal position.

14. A digging element, comprising an inverted U-shaped frame having concaved portions at its lower terminals, a pair of U-shaped members having their side arms converging upwardly and having the upper ends of said side arms rounded to conform to the concaved portions of said U-shaped frame and fitted thereinto, side walls secured to the inner sides of said inverted U-shaped frame and said U-shaped members, side walls secured to the outer sides of said inverted U-shaped frame and said U-shaped members, and digging elements pivotally secured to the side arms of the said U-shaped members and positioned between the side walls, applied to the inner sides of said inverted U-shaped frame and U-shaped members, said digging elements having upstanding wings at opposite sides fitting between the side walls at the inner and outer sides of said U-shaped members, and means for actuating said digging elements.

15. A digging implement, comprising a bucket having retainer sides, each formed of two spaced side walls and frame structures interposed between said walls, spacing members between said retainer sides at the top and bottom thereof, tie members tying said sides together in spaced relation, and digging elements interposed between said retainer sides and pivotally supported thereby, each digging element comprising two sections, one of which is capable of slight movement independent of the other, and means for actuating said digging elements.

16. A digging implement comprising an inverted U-shaped frame, a bucket at the lower end of said frame including digging elements, operating levers carried by said frame, operative connection between said operating levers and said digging elements, a series of cable sheaves carried in part by said operating levers and in part by said frame, and a cable in contact with said cable sheaves and acting to move said operating levers in one direction under power and to allow said levers to move in another direction upon releasing said cable.

17. A digging implement, comprising a frame, a bucket at the lower end of said frame including movable digging elements, supporting plates carried by opposite sides of said frame and extending in opposite directions therefrom, each supporting plate having a segmental slot, a pin passing through alined slots in the plates at opposite sides of said frame, operating levers mounted on said pins, cable sheaves carried by said operating levers and said frame, operative connection between said operating levers and said digging elements, and a cable co-operating with said sheaves and when operated in one direction serving to draw said operating levers inwardly and upwardly to maintain said digging elements in normal position, said operating levers swinging outwardly to move said digging elements to digging position when said cable is released.

18. A digging implement, comprising an inverted U-shaped frame, a supporting plate secured to each of the depending arms of said frame, a bucket at the lower end of said depending arms including digging elements serving as a bottom for said bucket and being movably arranged between the sides of said bucket, a pulley housing swiveled to the upper end of said frame and having spaced pulleys therein, two cable sheaves in vertical alinement between the depending arms of said frame, operating levers pivotally connected between said supporting plates and having cable sheaves co-axial with their centers, other cable sheaves carried by said operating levers, a cable adapted for movement in contact with said pulleys and sheaves, carriers pivotally mounted near the outer ends of said operating levers and having rollers rotatably mounted at their lower ends adapted for engagement with said operating levers, lifting and lowering levers pivotally connected to said carriers and having their axes coincident with said rollers, and flexible connection between said lifting and lowering levers and said digging elements.

19. A digging implement, comprising a frame, a bucket at the lower end of said frame having a bottom formed of two pivoted digging elements normally horizontally-retained in alinement, said digging elements being arranged at opposite sides of a plane passing transversely through said digging implement, operating mechanism at each side of said plane connected with a digging element at the same side thereof, and a single operating cable actuating said operating mechanism.

20. A digging implement having pivoted digging elements, and mechanism for operating said elements, including lifting and lowering levers pivotally mounted and adapted to be swung outwardly, chains applied to the outer ends of said lifting and lowering levers and adapted to be fastened to heavy objects to be lifted, and means for suspending said digging implement from an elevated point.

In testimony whereof I affix my signature.

JOHN ZICA.